US007603238B2

(12) United States Patent
Valero et al.

(10) Patent No.: US 7,603,238 B2
(45) Date of Patent: Oct. 13, 2009

(54) ANALYSIS OF TIME-SERIES DATA USING SINGULARITIES

(75) Inventors: Henri-Pierre Valero, Belmont, MA (US); Shu-Kong Chang, Houston, TX (US); Jean-Marie Degrange, Saint Martin En Bresse (FR); Vivian Pisre, Beijing (CN); Karan Singh, Machida (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 25 days.

(21) Appl. No.: 11/867,663

(22) Filed: Oct. 4, 2007

(65) Prior Publication Data

US 2009/0093961 A1 Apr. 9, 2009

(51) Int. Cl.
*G01V 1/28* (2006.01)
*G01V 1/00* (2006.01)
(52) U.S. Cl. ............................. 702/14; 702/16; 702/17; 367/73; 367/81; 367/86; 368/70
(58) Field of Classification Search ............... 72/14, 72/16–17; 367/73, 81, 86; 368/70; 702/14, 702/16–17
See application file for complete search history.

(56) References Cited

U.S. PATENT DOCUMENTS 5,850,622 A * 12/1998 Vassiliou et al. ............. 702/17
6,502,037 B1 * 12/2002 Jorgensen et al. ........... 702/14
6,745,129 B1 * 6/2004 Li et al. ...................... 702/17

OTHER PUBLICATIONS

Lyons et al., 'Singularity Analysis: a tool for extracting lithologic and stratigraphic content from seismic data', 2002, MIT Publication, pp. 1-14.*
Innanen, 'Local Signal Regularity and Lipschitz Exponents as a Means to Estimate Q', 2003, GEOP Publication, pp. 1-21.*
Grossmann, A., and J. Morlet, "Decomposition of Hardy functions into square integrable wavelets of constant shape", SIAM J. Math. Anal., 15, pp. 723-736, 1984.
S. Mallat and W.L. Hwang, "Singularity detection and processing with wavelets", IEEE Trans. Inf. Theory, vol. 38, No. 2, pp. 617-643, 1992.
William H. Press, Brian P. Flannery, Saul A. Teukolsky, William T. Vetterling, "Numerical Recipes in C++", the art of scientific computing, Chapter 13, Cambridge University Press, 1988.
Kristopher A. Innanen, "Local signal regularity and Lipschitz exponents as a means to estimate Q", pp. 1-21.
X.H. Wang, Robert S. H. Istepanian, "Application of wavelet modulus maxima in microarray spots recognition", IEEE Trans on Nanobioscience, vol. 2, No. 4, pp. 190-192, Dec. 2003.
Chun Liang Du and Wen-Liang Hwang, "Singularity detection and characterization with complex valued wavelets and their applications", pp. 1-33.

* cited by examiner

*Primary Examiner*—Edward Raymond
*Assistant Examiner*—Elias Desta
(74) *Attorney, Agent, or Firm*—Matthias Abrell; Jaime Castano; Dale Guadier

(57) ABSTRACT

A method for acquiring and analyzing time-series data using singularities is described. This method allows for the analysis of data over a wide spectrum of frequencies. Once the data is acquired in an oil field, singularities of the data are extracted; and the extracted singularities are utilized to interpret the formation properties related to the data.

20 Claims, 20 Drawing Sheets

ANALYSIS OF TIME-SERIES DATA USING SINGULARITIES

BACKGROUND

This disclosure relates to a method for analysis and interpretation of time-series data. More specifically, this disclosure relates to a method for analysis and interpretation of time-series data by determining the singularities of the data. One particular use is in analysis of data, such as acoustic waveforms, from a borehole in a logging operation.

Oil can be found in certain geologic formations at varying depths in the earth's crust. The oil is usually found trapped in layers of porous formations which lies beneath a dome shaped or folded layer of some non-porous rock such as shale. In other instances, oil is trapped at a fault, or break in the layers of the crust.

In the dome and folded formations, natural gas is usually situated between the non-porous layer and the oil described above. The layer beneath the oil is porous and usually is saturated with water. As is well known, oil may be collected by drilling a well. This drilling punctures the reservoir layer and if the penetration is shallow, only natural gas will be collected, if the penetration goes too far, then too much water will be produced. Therefore, it is highly desirable to determine the formation properties at a given depth in the borehole.

Also, the composition of the formation surrounding a borehole may be of interest. Depending on the formation, it may be evident that another area nearby will provide a better return when drilled. Data acquired during logging operations are used to give insight to these materials.

Accurate analysis of acoustic data gathered from a borehole in an oil well is challenging and complex. The field of sonic logging of boreholes involves making acoustic measurements in the borehole at a wide range of frequencies. Acoustic data is generally collected using at least one transmitter and one receiver. There are several different configurations in which borehole acoustic data can be collected. These include cross-well imaging (transmitter in one borehole and receiver in another), borehole seismic (transmitter on the surface and receiver in a borehole), and single-well imaging (transmitter and receiver in the same borehole). Gathering, separating, and analyzing this acoustic data has significant practical applications including fracture identification, compartmentalization, and composition determination.

In order to collect sonic logging data, an acoustic source radiates a compressional wave pulse, which propagates into the surrounding formation. As this pulse enters the formation, it excites compressional and shear waves in the formation. These waves produce head waves in the borehole fluid that may be measured. Also, in their propagation through the formation, the compressional and shear waves encounter interference that results in returning energy back towards the borehole where the receiver may be located. The acoustic responses include head waves and guided borehole waves and Stoneley waves. All of these waves are recorded by the receiver.

The data gathered by the receiver can provide a large amount of information that is highly valuable for the exploration and development of hydrocarbon resources. However, this data must first be accurately analyzed and interpreted. The data retrieved in sonic well logging are extremely complicated because various wave components overlap in time and in frequency or in both domains simultaneously. Unfortunately, standard Fourier transform techniques are not able to discriminate components that overlap in frequency domain, making it difficult to extract information in this case. In order to work around this weakness, conventional systems typically separate frequency spectra to provide low frequency and high frequency analysis. This analysis is useful, but valuable information can be lost due to the overlapping time and frequency components.

Accordingly, it would be desirable to envision a method that would allow analysis of the time series data across a wide range of frequencies, also referred to as a multi-scale analysis. This would allow for a more thorough and informative result that in the instant case could help in analyzing the formation properties surrounding the borehole.

The difficulties and limitations suggested in the preceding are not intended to be exhaustive, but rather are among many which demonstrate that although significant attention has been devoted to increasing the information produced in analyzing time-series data, specifically acoustic data, prior attempts do not satisfy the need for analysis of data across a wide range of frequencies.

BRIEF SUMMARY OF ONE EMBODIMENT

One embodiment which is intended to accomplish the foregoing objects comprises a method for analyzing and interpreting time-series data. The method comprises acquiring data, computing the wavelet transform of the data, computing the Lipschitz coefficients, that will provide the characterization of the singularities of the data, and representing these singularities with respect to time. This method allows for interpretation over recorded frequencies, also referred to as multi-scale analysis. This type of analysis and interpretation is useful, for example, in oil well borehole sonic data processing due to the complexity of the data that is collected.

THE DRAWINGS

Objects and advantages of the present disclosure will become apparent from the following detailed description of embodiments taken in conjunction with the accompanying drawings, wherein.

DETAILED DESCRIPTION

Figure 1:
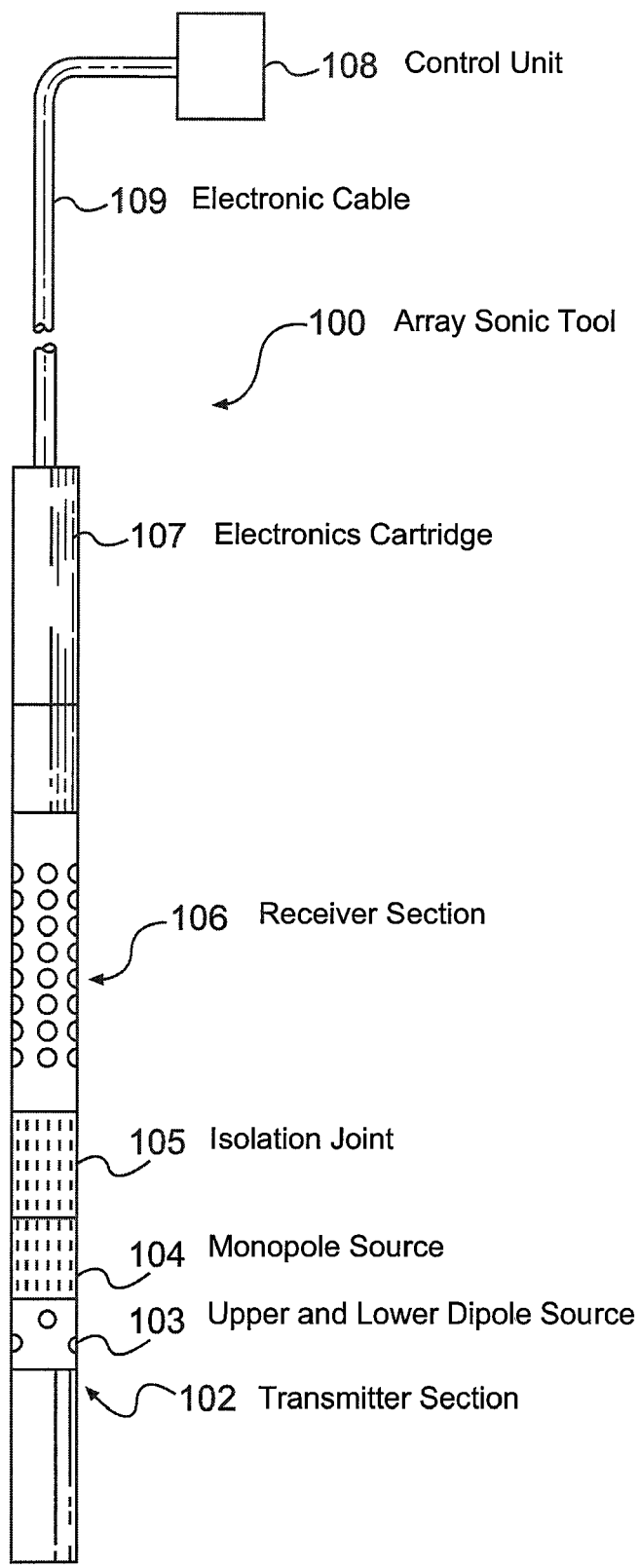
FIG. 1 is a schematic view of the context in which one embodiment of the disclosed system is intended to operate.

Referring now to the drawings and particularly to FIG. 1, there is shown a schematic illustration of one operational context from which sonic/acoustic data isare collected in a borehole. FIG. 1 is a schematic representation of an Array Sonic Tool 100(such as the Dipole Sonic Imaging Tool (DSI) (SLB Schlumberger Trademark), Sonic Scanner (SLB Schiumberger Trademark), etc.) comprising a transmitter section 102 having a pair of upper and lower dipole sources 103 arranged orthogonally in the radial plane and a monopole source 104. A sonic isolation joint 105 connects the transmitter section 102 to a receiver section 106 that contains an array of one or more receivers. An electronics cartridge 107 is connected at the top of the receiver section 106 and allows communication between the tool and a control unit 108 located at the surface via an electronic cable 109. With such a tool, it is possible to make both monopole and dipole measurements. This tool may be implemented for wireline logging or for logging while drilling (LWD). In fact, time-series data collected in any manner can be analyzed using this method. Other implementations such as Schiumberger's Sonic Scanner™ may also be used to collect the data. Regardless of the collection platform, the analysis of the data will proceed as described below.

Figure 2:
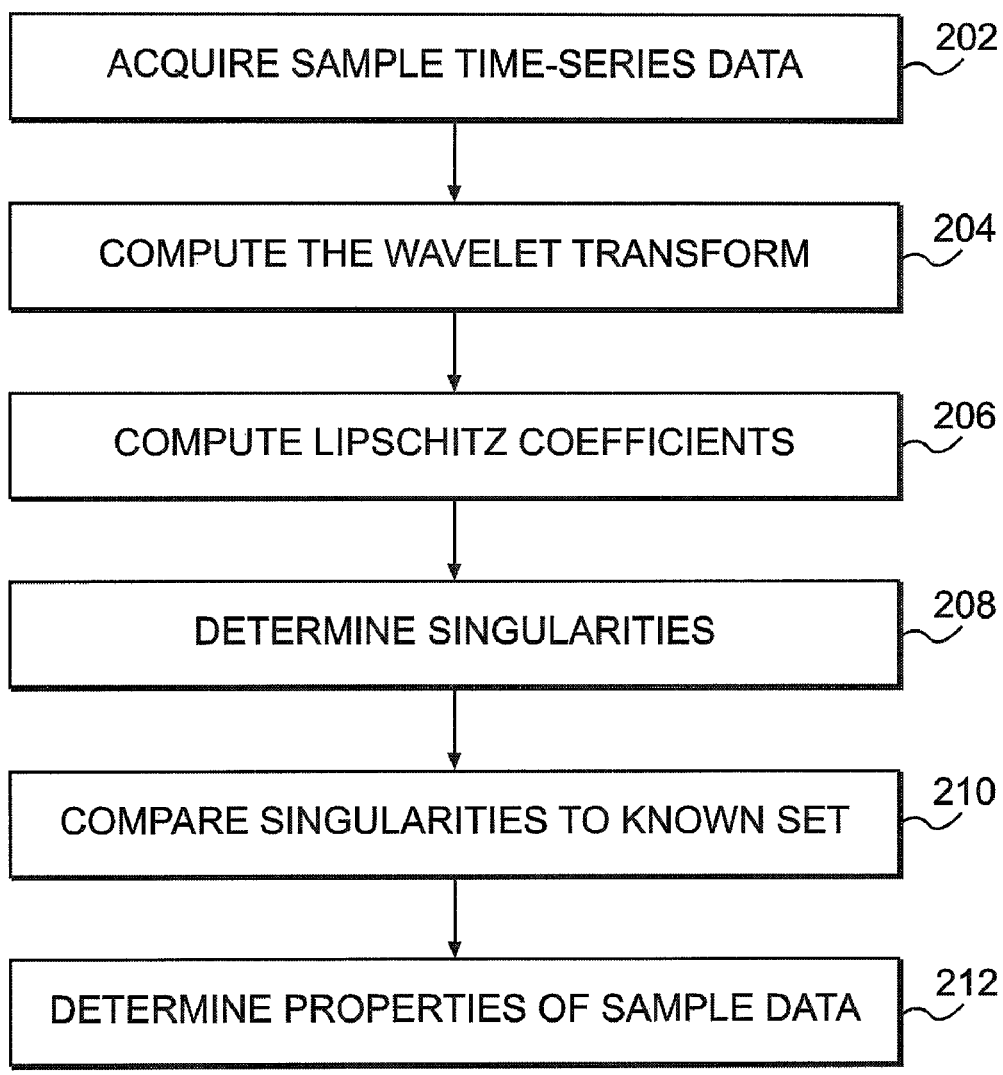
FIG. 2 is a flow chart of the steps of one embodiment.

Turning to FIG. 2, a flowchart is shown representing the high level steps in the instant method. This is an introduction to the method that will be further discussed in detail below. The first step, labeled 202, is acquiring time-series data to be analyzed. In one embodiment, the time-series data are acoustic data collected using an instrument such as the one shown in FIG. 1. The method is also useful on any type of time series data including, but not limited to, seismic data, resistivity data, pressure data, and temperature data. The acoustic data are collected from the borehole and may give insight to the surrounding fluid and solid formations. Once the data are acquired, wavelet transform of the data is computed in step 204. Wavelet transform essentially translates a signal in the time domain to the time-frequency space where the local regularity of the signal can be isolated and utilized. The result of wavelet transform is then used in the computation of the Lipschitz Coefficients in step 206. These coefficients are indicative of the regularity of the signal and give insight into where the data changes in form. In fact it allows the study and analysis of abrupt changes present in the analyzed signal or in its derivatives. From the Lipschitz coefficients, the singularities of the sample data are determined in step 208. These singularities correspond to shapes of transitions included in the sample data and therefore are linked to the medium crossed by the recorded signal. Knowing this, in step 210, the calculated singularities can be compared to known singularities that correspond to materials expected to be present in the borehole. Note that there are various ways to make this comparison. The Kolmogorov-Smirmov tests [W.H. Press et al, 1988] may be used, or the Mahalanobis distance, for example, also may be computed. This known set of singularities is referred to as the control set and is determined through experimentation such as, prior experience in analyzing borehole data, theoretical or numerical modeling, or analysis of data from laboratory experiments. From this comparison, in step 212, properties of the material surrounding the tool 100 and the borehole are determined. In the instant case, these properties include the composition of both the fluid and the solid formations surrounding the tool.

Step 202 is performed by tool 100, once this data are acquired, the subsequent steps may take place downhole or at a processing center at or near ground level, for example, at a processing center located at the surface or at an underground location accessible from the surface. The first computational step involves the computation of the wavelet transform of the acquired data. The wavelet transform translates a signal represented in the time domain into a time-frequency space where the local regularity can be characterized by decomposing the signal into elementary wavelets. The major characteristic of the wavelets is that all members of a given wavelet family $\Psi_{s,x}$, are generated by translating and dilating a given initial wavelet $\psi$ which is called "the mother wavelet." The wavelet transform of a function f(t) is defined by $$Wf(s, x) = \int_{-\infty}^{\infty} f(t) \Psi_{s,x}^* dt. \tag{1}$$

where the Wf(s,x) is the coefficient of wavelet transform, s is the coordinate on the scale axis, and x is the coordinate on the time axis. The notation $\Psi_{s,x}^*$ represents the complex conjugate of the mother wavelet. In practice, the wavelet transform can also be expressed as convolution between the function f(t) and the mother wavelet $\psi(x/s)$. Additional information regarding wavelet transform may be found in, for example, Grossmann and Morlet, 1984, and Mallat and Hwang, 1992, which discuss the use of continuous wavelet transform to compute singularities.

The wavelet transform projects the signal on a family of translated and dilated basis functions and these functions can be represented in $L^1$, or, $L^2$ norm as For L1 (2)

$$\psi_{s,x} = \frac{1}{\sqrt{s}} \psi\left(\frac{x-t}{s}\right)$$

-continued

For L2

$$\psi_{s,x} = \frac{1}{s}\psi\left(\frac{x-t}{s}\right) \quad (3)$$

The parameters x and s are the translation and scale parameters, respectively. The Fourier transform of the mother wavelet satisfies the following conditions $$\int_0^{+\infty} \frac{|\hat{\psi}(\omega)|^2}{\omega}d\omega = \int_{-\infty}^0 \frac{|\hat{\psi}(\omega)|^2}{|\omega|}d\omega = C_\psi < +\infty \quad (4)$$

The localization and characterization of singularities are best done with continuous wavelet transform, which is translation invariant and allows focus on the sharp variations present in the signal or in the time derivatives of the signal. This is an important property of wavelet transform allowing the characterization of the local regularity of functions which is often measured with Lipschitz coefficients.

The singularities of a function are often characterized by its Lipschitz coefficient values. As used herein, "singularities" refer to a discontinuity in the analyzed signal or its derivatives. As shown in Mallat and Hwang, the singularities can be expressed with the values that are given by estimation of the Lipschitz coefficient. An example of a function with singularity is the following canonical function $$f(x) = \beta(x-x_0)^\alpha, x > x_0 \quad (5)$$

where $(x-x_0)^\alpha$ can have a singularity at the time $x_0$. Note that this canonical function is used for better understanding. In fact most of the singularities in a signal can be expressed in the form of the canonical function at least near the singularities. This function is described by different values of the parameters, $x_0$, $\beta$, $\alpha$. The wavelet transform of this function can be expressed as follows $$Wf(s,x) = \beta W[(x-x_0)^\alpha](s,x) \quad (6)$$

where (s,x) is the coordinate on the frequency and time axes. Here, the term "frequency" has been used generally in place of a more precise "scale" in wavelet transforms.

By using the nth derivative of the mother wavelet $\psi$ as the new mother wavelet and the L2 norm, the wavelet transform of Equation (6) can be decomposed as follows:

$$\beta[W(x-x_0)^\alpha](s,x) = \beta\frac{1}{s}\cdot\frac{d^n}{d(x/s)^n}\cdot\psi\left(\frac{x}{s}\right)*(x-x_0)^\alpha \quad (7)$$

$$= \beta s^\alpha \cdot \frac{d^{(n-\alpha-1)}}{d(x/s)^{(n-\alpha-1)}}\cdot\psi\left(\frac{x}{s}\right)*\frac{d^{(\alpha+1)}}{dx^{(\alpha+1)}}$$

$$(x-x_0)^\alpha$$

$$= \Gamma(\alpha+1)\cdot\beta s^\alpha \cdot \psi^{n-\alpha-1}\left(\frac{x}{s}\right)*\delta(x-x_0)$$

$$= \Gamma(\alpha+1)\beta s^\alpha \psi^{n-\alpha-1}\left(\frac{x-x_0}{s}\right),$$

where $n \geq \alpha+1$, the symbol * represents the convolution operator on the variable x, $\psi^{n-\alpha-1}$ denotes the (n-a-1) derivative of $\psi$. In order to derive the previous expression, the following property has been used [Gel'fand and G. E. Shilov, 1962], i.e., for any function g(x) which is continuous and its 1st derivative is continuous, $$g(x)*\frac{d^{\alpha+1}}{dx^{\alpha+1}}(x-x_0)^\alpha = \Gamma(\alpha+1)\delta(x-x_0)*g(x) \quad (8)$$

Once the precise location of a singularity at $x_0$ is known, the order of the Lipschitz regularity a can be estimated. The value $\alpha$ is also named as Lipschitz coefficient. A function f(x) having a singularity at $x_0$ with the order of Lipschitz regularity $\alpha$ is usually termed as "f(x) is Lipschitz $\alpha$ at $x_0$." The value of $\alpha$ for some simple functions with singularities can be found based on Equations (7) and (8). For example, $\alpha=-1$ for a dirac delta function $\delta(t)$, $\alpha=0$ for a step function (or Heaviside function) H(t), $\alpha=1$ for a ramp function r(t), $\alpha=2$ for u(t), $\alpha=0.5$ for a square root function sq(t), $\alpha=1.5$ for sq3(t), and $\alpha=2.5$ for sq5(t). Here, the definitions of these functions are:

$$\delta(t) = 0 \text{ if } t \neq 0,$$

$$H(t) = \begin{cases} +1 \text{ if } t > 0 \\ \frac{1}{2} \text{ if } t = 0 \\ 0 \text{ if } t < 0, \end{cases}$$

$$r(t) = \int H(t)dt,$$

$$u(t) = \int r(t)dt,$$

$$sq(t) = t^{1/2}, sq_3(t) = t^{3/2}, sq_5(t) = t^{5/2}.$$

The relationship between singularities and modulus maxima of the wavelet transform [Mallat and Hwang, 1992] is now discussed. Let n be a positive integer and $\alpha \leq n$. Let $f(x) \in L^2(R)$. If f(x) is Lipschitz $\alpha$ at $x_0$, then there exists a constant A such that for all points x in a neighborhood of $x_0$ and any scale s, such as $$|Wf(s,x)| \leq A(s^\alpha + |x-x_0|), \quad (9)$$

where Wf (s,x) represents the coefficients of wavelet transform.

Conversely, let $\alpha < n$ be a non-integer value. The function f(x) is Lipschitz $\alpha$ at $x_0$ if the following two conditions hold:
1) There exists some $\epsilon > 0$ and a constant A such that for all points x in a neighborhood of $x_0$ and scale s $$|Wf(s,x)| \leq As^\epsilon, \quad (10)$$

and
2) there exists a constant B such that for all points in a neighborhood of $x_0$ and any scale s $$|Wf(s,x)| \leq \beta\left(s^\alpha + \frac{|x-x_0|}{|\log|x-x_0||}\right). \quad (11)$$

Knowing this, it is important to then characterize a particular class of isolated singularities from the behavior of the wavelet transform modulus maxima. Modulus maxima is the location of the local maxima of the absolute value of the wavelet transform Wf(s,x). Normally modulus maxima coincide with the location of maximal energy. Let f(x) be a function whose wavelet transform is defined over ]a,b[ and let $x_0 \in ]a,b[$. Assuming that a scale $s_0 > 0$ and a constant C exist such that for $x \in ]a,b[$ and $s < s_0$, all the modulus maxima of Wf(s,x) belong to a cone defined by $$|x-x_0| \geq C \cdot s. \quad (12)$$

Then, at all points $x_1 \in ]a,b[, x_1 \neq x_0$, f(x) is uniformly Lipschitz n in the neighborhood of $x_1$. Letting $\alpha<n$ be a non-integer, the function f(x) is Lipschitz $\alpha$ at $x_0$ only if there exists a constant A such that at each modulus maxima (s,x) in the cone defined by $$|Wf(s,x)| \leq As^\alpha \quad (13)$$

this theorem can also be written in an equivalent form $$\log|Wf(s,x)| \leq \log(A) + \alpha \cdot \log(s). \quad (14)$$

The above equations are also valid for the case where $\alpha$ is a non-positive integer, for which the function also have singularity with Lipschitz regularity $\alpha$.

This form proves that the Lipschitz regularity (i.e., a) at $x_0$ is the maximum slope of a straight line that remains above log|Wf(s,x)|, on a logarithmic scale. This series of equations shows that the Lipschitz regularity is computed by finding the coefficient $\alpha$ that best approximates the decay of |Wf(s,x)| over a given range of scales larger than 1. Once the mother wavelet is selected, the local modulus maxima are detected as it provides direct information on the regularity of the signal as presented above. It is known that the modulus of the wavelet transform is biased in the presence of noise. Therefore, rather than using the standard approach consisting of the detection of the maxima of Wf(s,x), a more robust alternative approach is proposed and presented now. In this case, the local regularities of the signal are estimated through the computation of the sum of the modulus of its wavelet coefficients inside the corresponding "cone of influence" (COI), which is the support of the wavelet at different scales, defined as follows:

$$S_W f(x) = \int_{|x-x_0| \leq K \cdot s} |Wf(s,x)| ds, \quad (15)$$

where $S_w f(x)$ is an operator equal to the sum of the modulus of the wavelet coefficients, |Wf(s,x)| considered in an interval $|x-x_0| \leq K \cdot S$ along the scale axis. K is the size of the interval which is taken as the support of the mother wavelet considered in the analysis. The position and value of the local maxima of $S_w f(x)$ will be used to compute the Lipschitz computation rather than the local modulus maxima of the wavelet transform. The summation along the frequency axis is selected for the detection method as it provides a robust way to obtain the estimation of the Lipschitz coefficient as the detection of the maxima will have a smaller perturbation caused by noise. By this transformation, useful information in the signal is retained, and the noise component in the signal is decreased. In consequence, the local modulus maxima positions will be detected using this method having significantly reduced noise perturbation. Using Equation 14 and the "new maxima" approach described above, estimation of the Lipschitz coefficients may be obtained in a robust manner.

Figure 3:
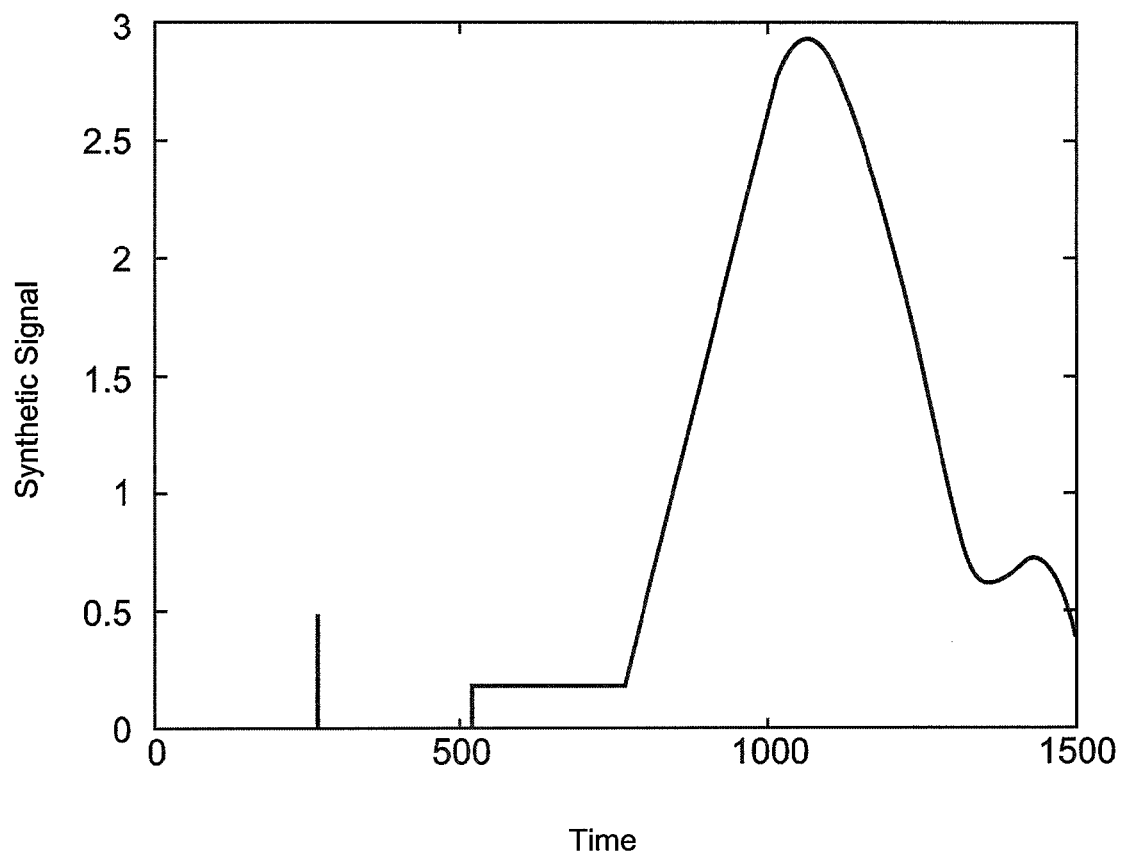
FIG. 3 is a graphical representation of synthetic test data.

An illustrative example of the method can be shown by considering a synthetic signal built as a linear combination of signals defined using the canonical expression presented in Equation 5. The signal is composed of components exhibiting various singularities order at various time positions. The signal test is defined by the following equation:

$$s(t) = \delta(t-t_1) + 0.5H(t-t_2) + 0.01r(t-t_3) - 0.001sq_3(t-t_4) + 0.0001u(t-t_5) - 0.00001sq_5(t-t_6) \quad (16)$$

where $\delta(t)$, H(t), r(t), u(t), sq(t), $sq_3(t)$, and $sq_5(t)$. have been defined previously. The test signal contains various singularities $$\alpha = \left\{-1, 0, 1, \frac{3}{2}, 2, \frac{5}{2}\right\}$$

located at the time $t=\{t_1, t_2, t_3, t_4, t_5, t_6\} = \{255, 511, 767, 1023, 1279, 1379\}$. A graphical representation of the signal is shown in FIG. 3.

Figure 4:
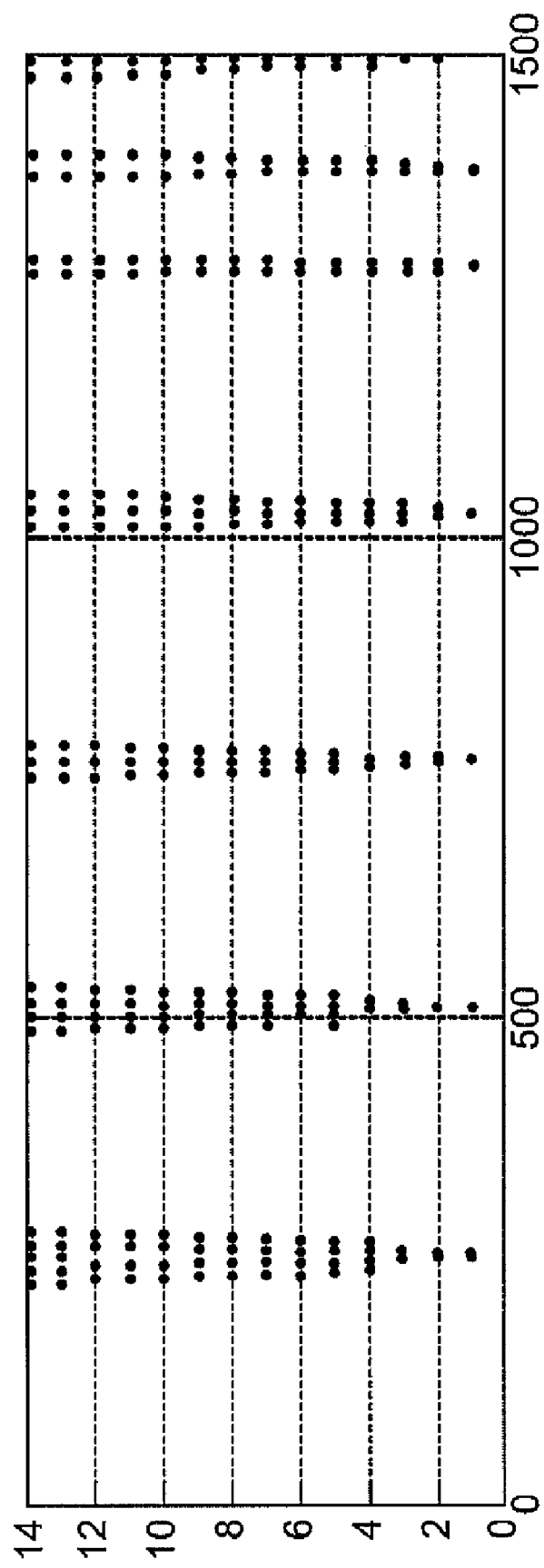
FIG. 4 is a graphical representation of local modulus maxima of data depicted in FIG. 3.

FIG. 4 shows the modulus computed for the signal. Here the horizontal axis is time shift, x, and the vertical axis is scale, s. The lines of modulus maxima are then obtained and used to compute the order of the singularity. Note that the maxima lines will converge to the location of the singularity (e.g., x0 in Equations 5 and 6) as the scale, s, is small. Accordingly, this approach could be useful to detect the existence of various components of a signal and their respective properties related to the material being investigated.

Figure 5:
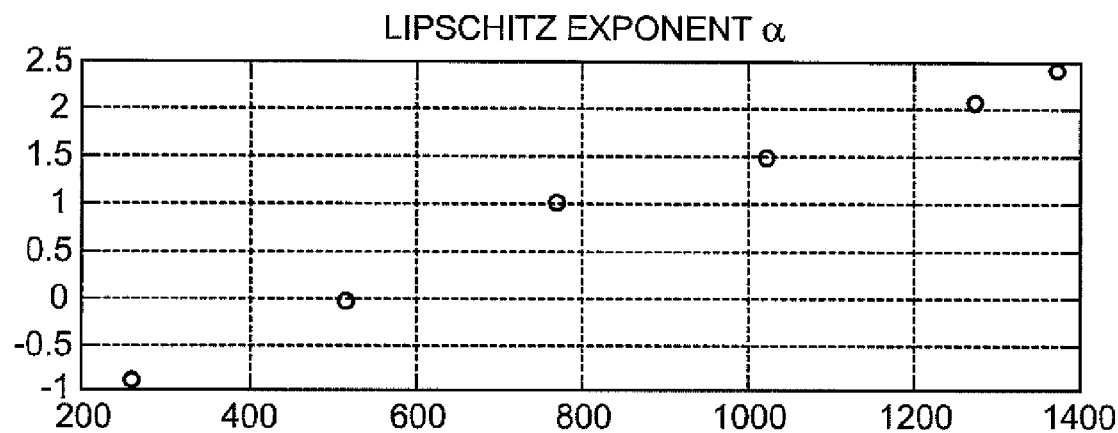
FIG. 5 is a graphical representation of the Lipschitz Coefficients of data shown in FIG. 3.
Figure 6:
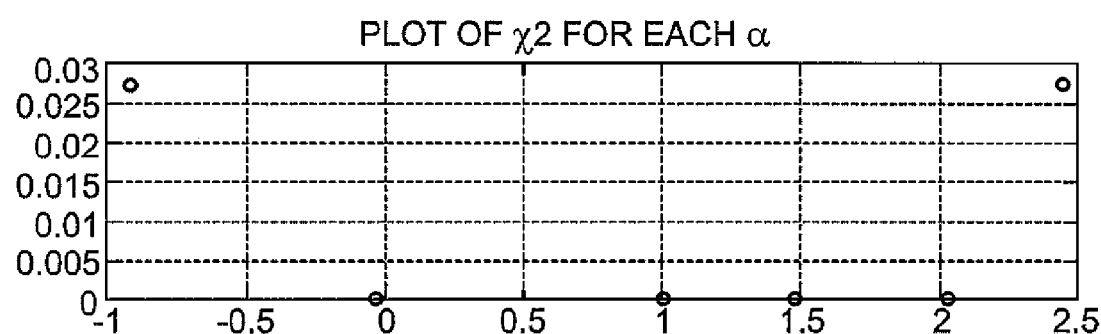
FIG. 6 is a graphical representation of the accuracy of the estimation of the data shown in FIG. 3

A log-log plot representation gives a direct estimation of Lipschitz coefficient $\alpha$ using linear regression. The coefficient $\alpha$ will correspond to the slope of this linear fit. FIG. 5 shows the estimation of the Lipschitz coefficient, $\alpha$, on the vertical axis and its localization time, x, on the horizontal axis. FIG. 6 shows the accuracy of the estimation for the synthetic signal. Note that all the various singularities have been properly located in the time domain and their respective order properly estimated.

Singularities have been used in the past for various other applications, like image processing, for example, as discussed in X. H. Wang et al, K. A. Innanen, and C. L. Du and W. L. Hwang. Disclosed herein is a new approach to analyze and extract singularities as attributes from sonic data and other time-series data. The Lipschitz coefficients $\alpha$ obtained correspond to the shapes of transitions in the original waveform and therefore are indicative of the medium encountered by the acoustic waves detected by the receiver(s) and recorded by the recording system. The location of a in time indicates that at that time, the waves propagating in the formation or fluid changed or encountered a particular medium. Conventionally time series data are represented by the amplitude variation as a function of time. The extraction of Lipschitz coefficients $\alpha$ and the singularity locations is a way to quantify variations due to the propagation in the medium. As it is possible to quantify and detect various components, it is therefore possible to denoise and filter the time series of interest using the detected singularities.

One method for filtering is now discussed. One comparatively simple approach uses a predefined threshold. Singularities that have a value greater than or less than the predetermined threshold value are retained. The predefined threshold may be set by the user, or it may be defined based on experience, i.e., after analyzing a certain number of data sets it is possible to define a certain value for certain types of rocks. Another approach is based on automatic filtering, without human intervention. In this approach, all the computed singularities in one section of a well are used and a clustering analysis is applied to the data. The clustering analysis will extract various classes of singularities that are present in the analyzed section, i.e., the various components present in the data. Therefore, the algorithm will filter the data corresponding to the various classes found by the clustering analysis.

Figure 7:
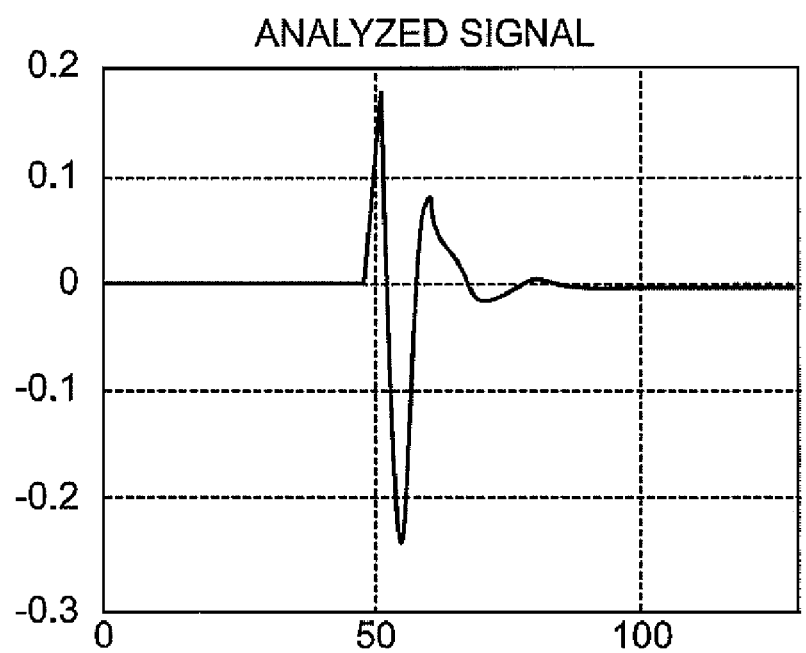
FIG. 7 is a graphical representation of a set of synthetic sonic data.
Figure 8:
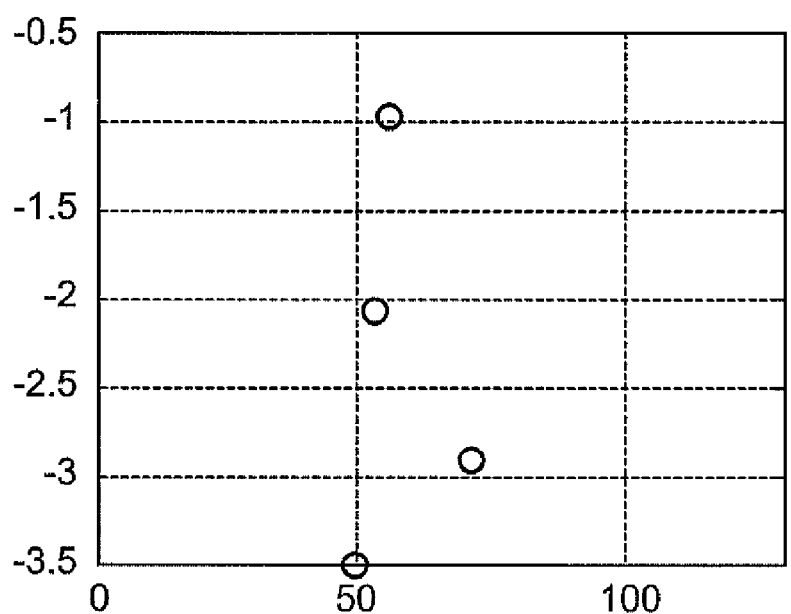
FIG. 8 is a graphical representation of the singularities of the data in FIG. 7.
Figure 9:
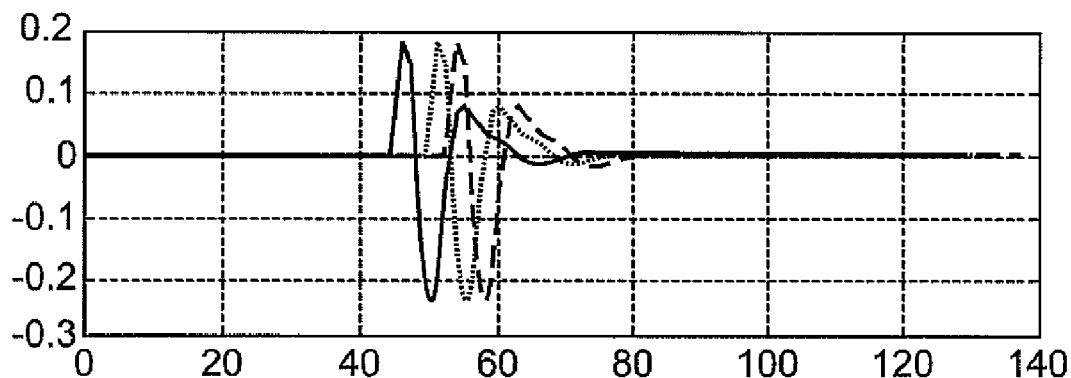
FIG. 9 is a graphical representation of the time shifted synthetic sonic data of FIG. 7.
Figure 10:
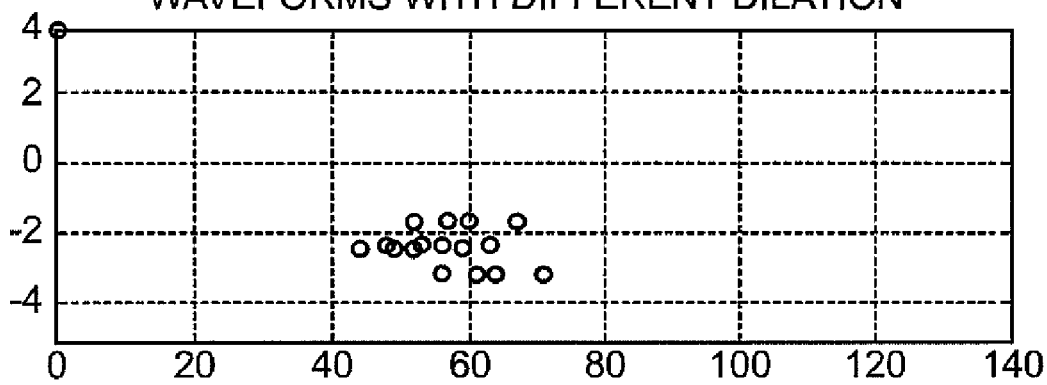
FIG. 10 is a graphical representation of the singularities of the time shifted synthetic sonic data.

It can be shown that a shift in time or a change in amplitude will not change the results of Lipschitz coefficients $\alpha$. FIG. 7 is a representation of a synthetic sonic signal. Using the previously described method, the singularities shown in FIG. 8 are detected. FIG. 9 shows the signal after it has been time shifted and FIG. 10 shows the singularities determined after this shifting. A similar result is obtained when the signal is changed only in amplitude. This singularities detection demonstrates that the Lipschitz coefficients $\alpha$ capture only the shapes of the waveform, neither shifting on the time axis nor the variation of amplitude have influence on $\alpha$.

Figure 11:
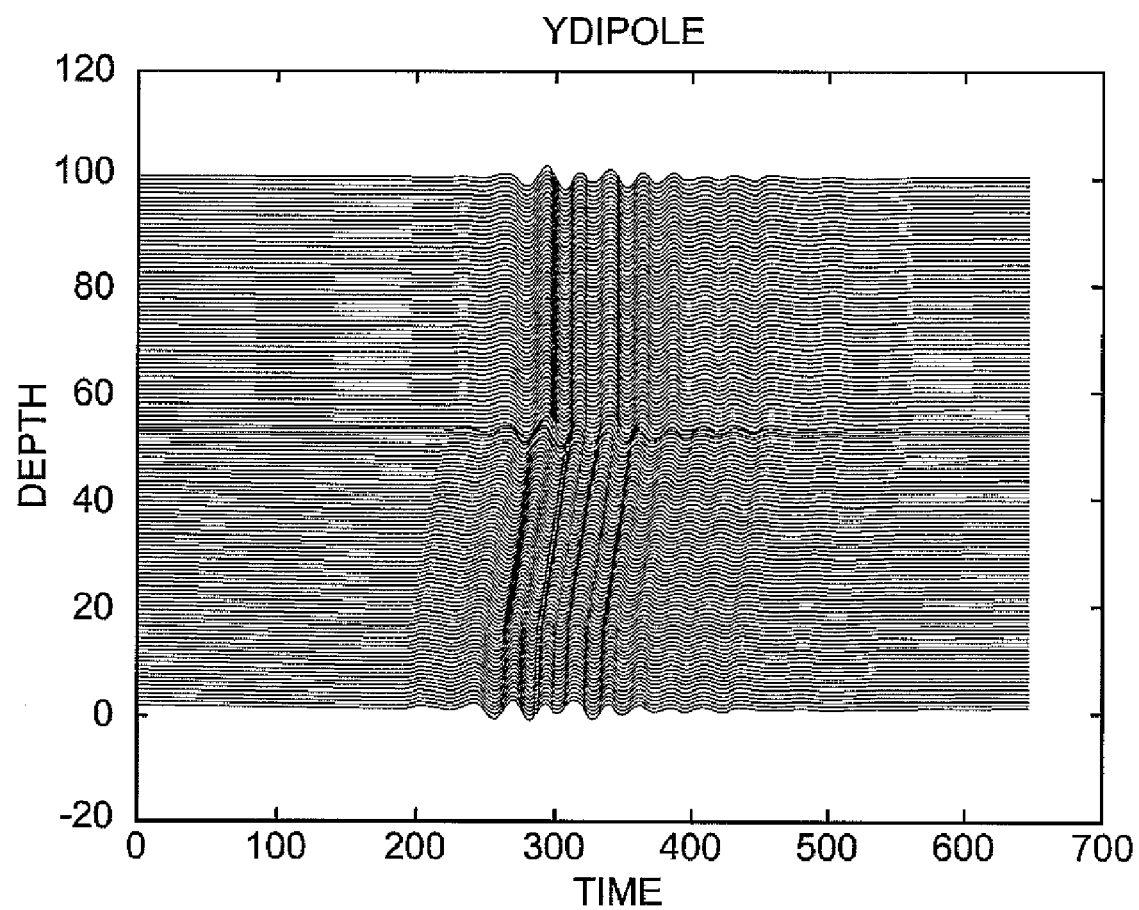
FIG. 11 is a graphical representation of actual acoustic data gathered from a borehole.
Figure 12:
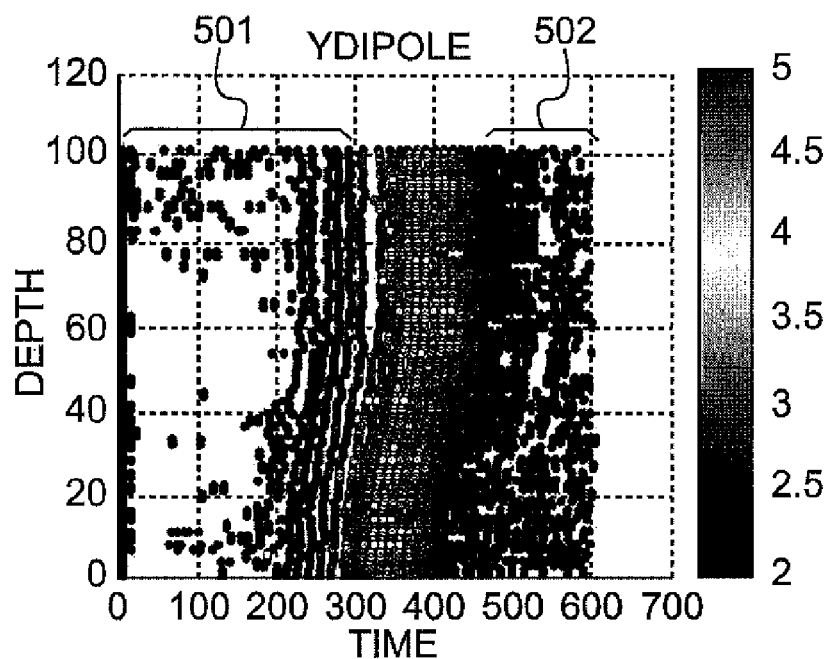
FIG. 12 is a graphical representation of the singularities of the signal shown in FIG. 11.
Figure 13:
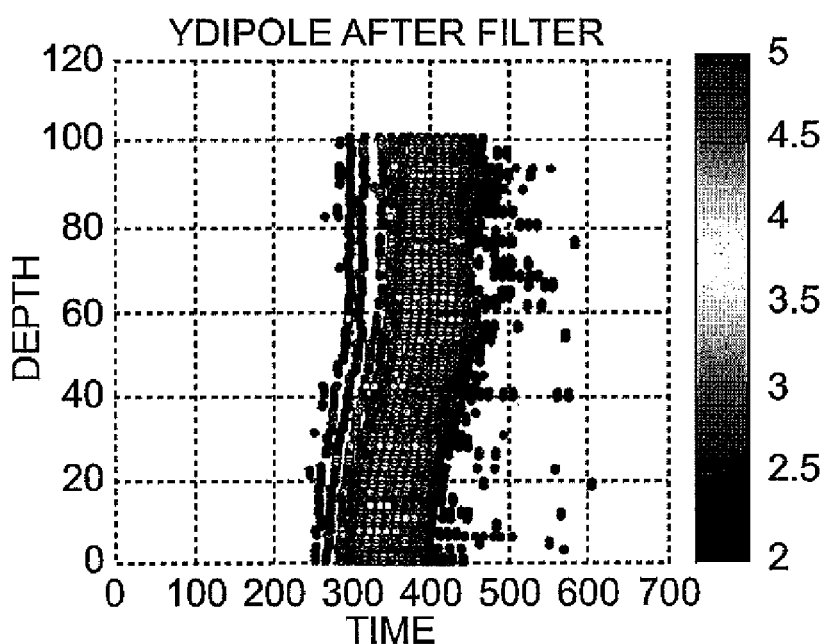
FIG. 13 is a graphical representation of the singularities shown in FIG. 12 after filtering.

The application of the method to real borehole data is discussed hereinafter. FIG. 11 shows a set of acoustic data gathered from a borehole. By analyzing the singularities in the waveforms, it is possible to filter out unwanted wave components. For example, the data shown in FIG. 11 represent at least two signals, the desired Y dipole, contaminated by a monopole signal. The singularities of the data are determined using the method described above. These singularities are represented in FIG. 12 as a function of time and depth. As can be seen, the singularities track the shape of the original signal. Further, by looking at the variety of values, it becomes clear that what appeared to be each waveform is actually a combination of waveforms that may be the results of interference by undesirable waves. One embodiment of this invention is to remove the undesirable interferences by removing the extraneous singularities from the original waveforms. FIG. 13 shows the singularities after the removal of spurious singularities 501 and 502. This filtering process can be very beneficial to improve the quality of the measured data.

Figure 14:
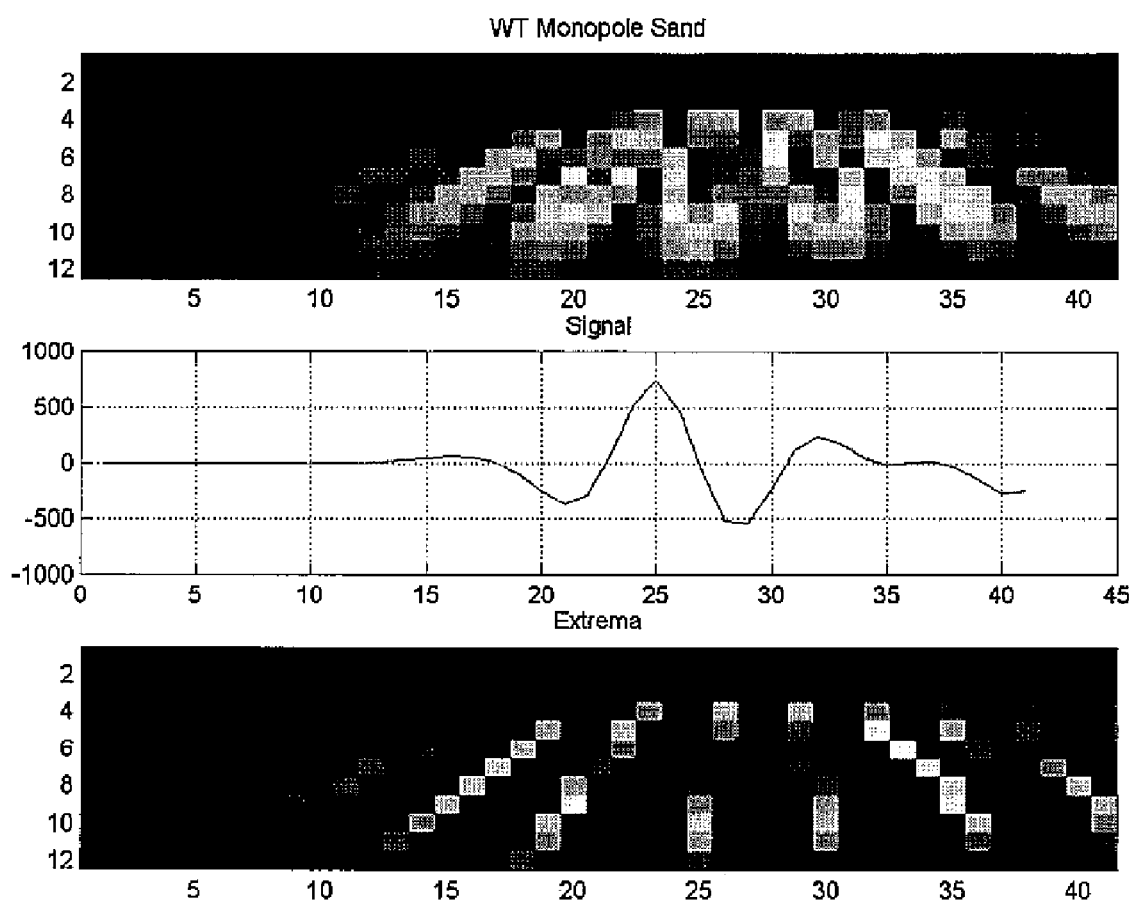
FIG. 14 is a graphical representation of wavelet transformed compressional signals and extrema lines in the case of a sand interval.
Figure 15:
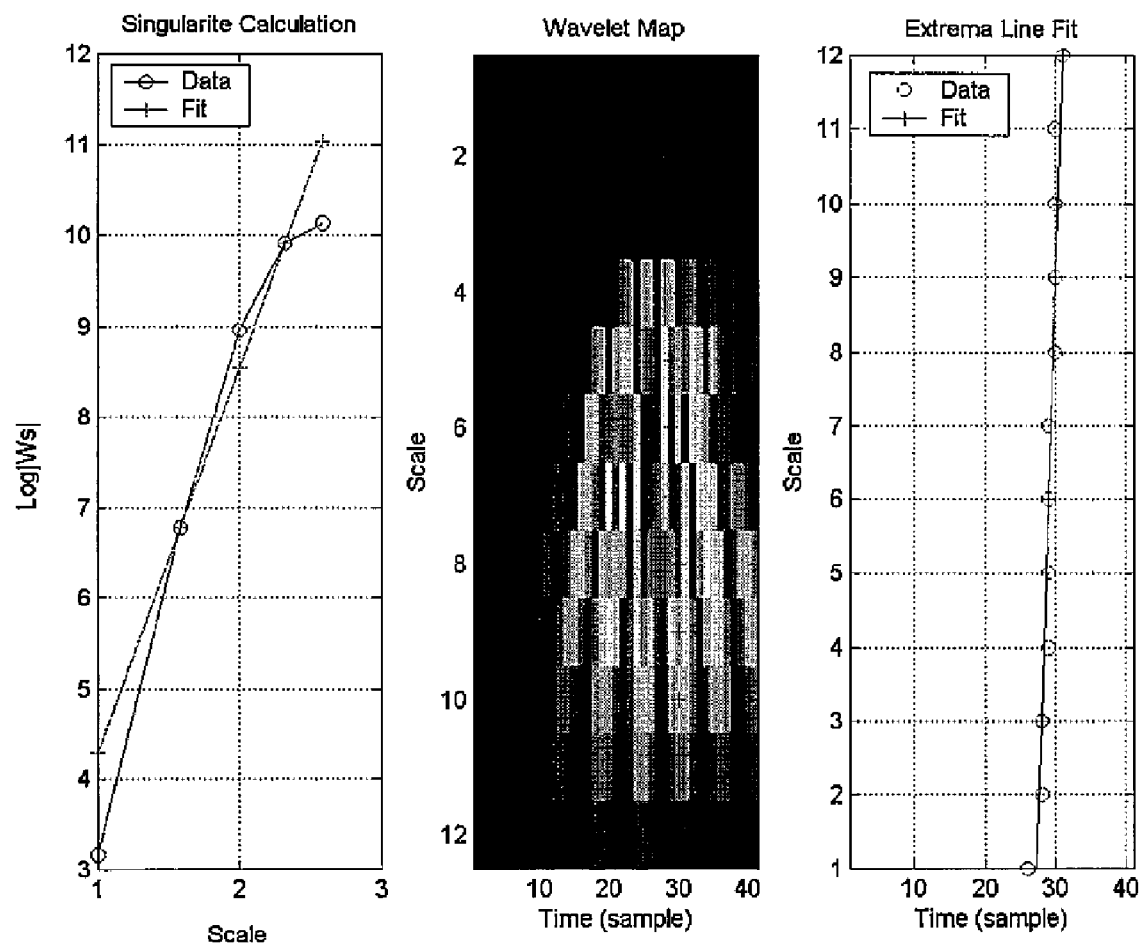
FIG. 15 is a graphical representation of extrema line fit, wavelet map and singularity calculation in the case of compressional signals recorded in a sand interval.
Figure 16:
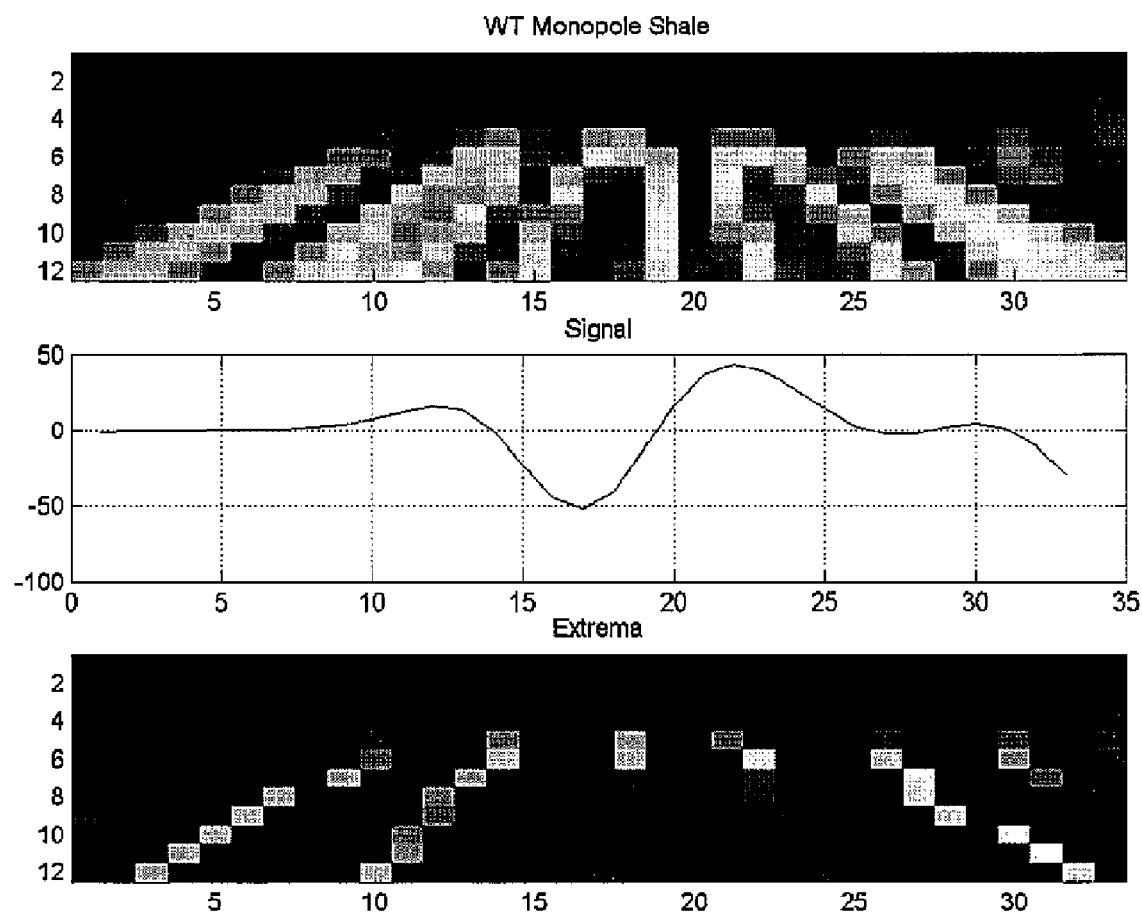
FIG. 16 is a graphical representation of wavelet transformed compressional signals and extrema lines in the case of a shale interval.
Figure 17:
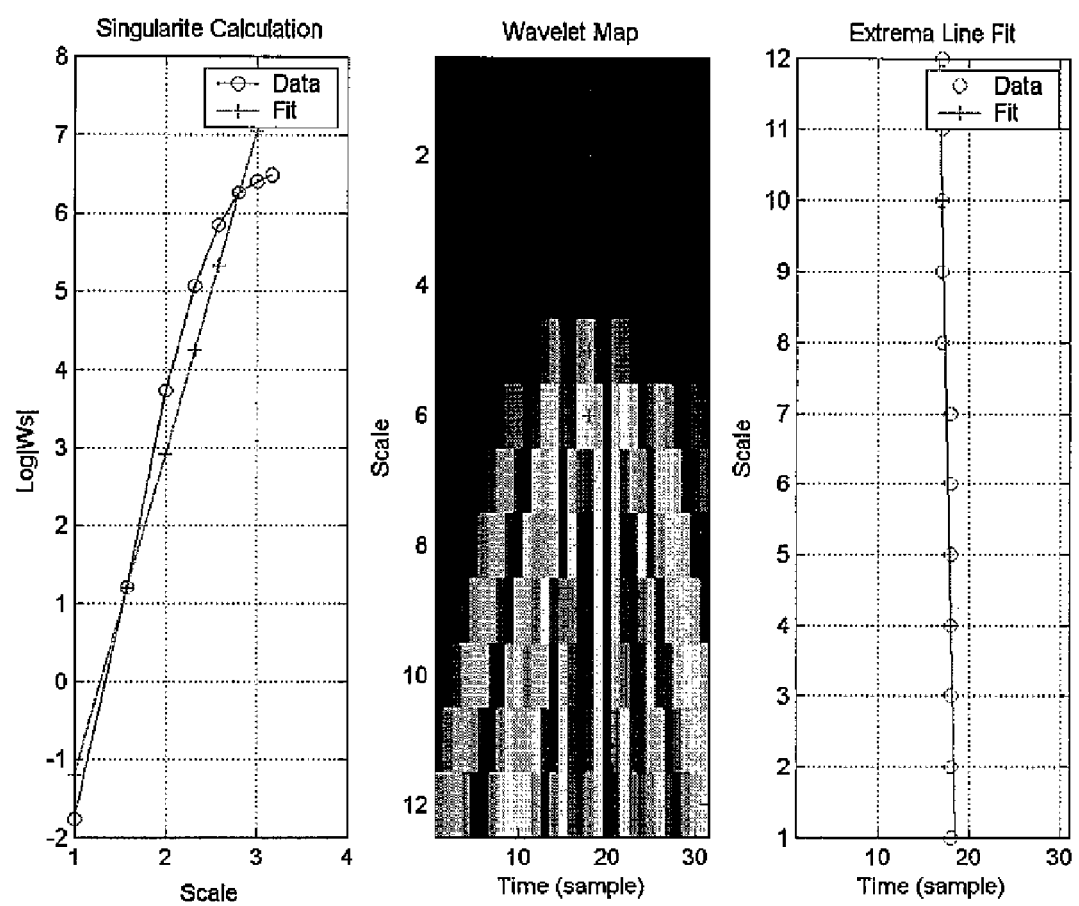
FIG. 17 is a graphical representation of extrema line fit, wavelet map and singularity calculation in the case of compressional signals recorded in a shale interval.
Figure 18:
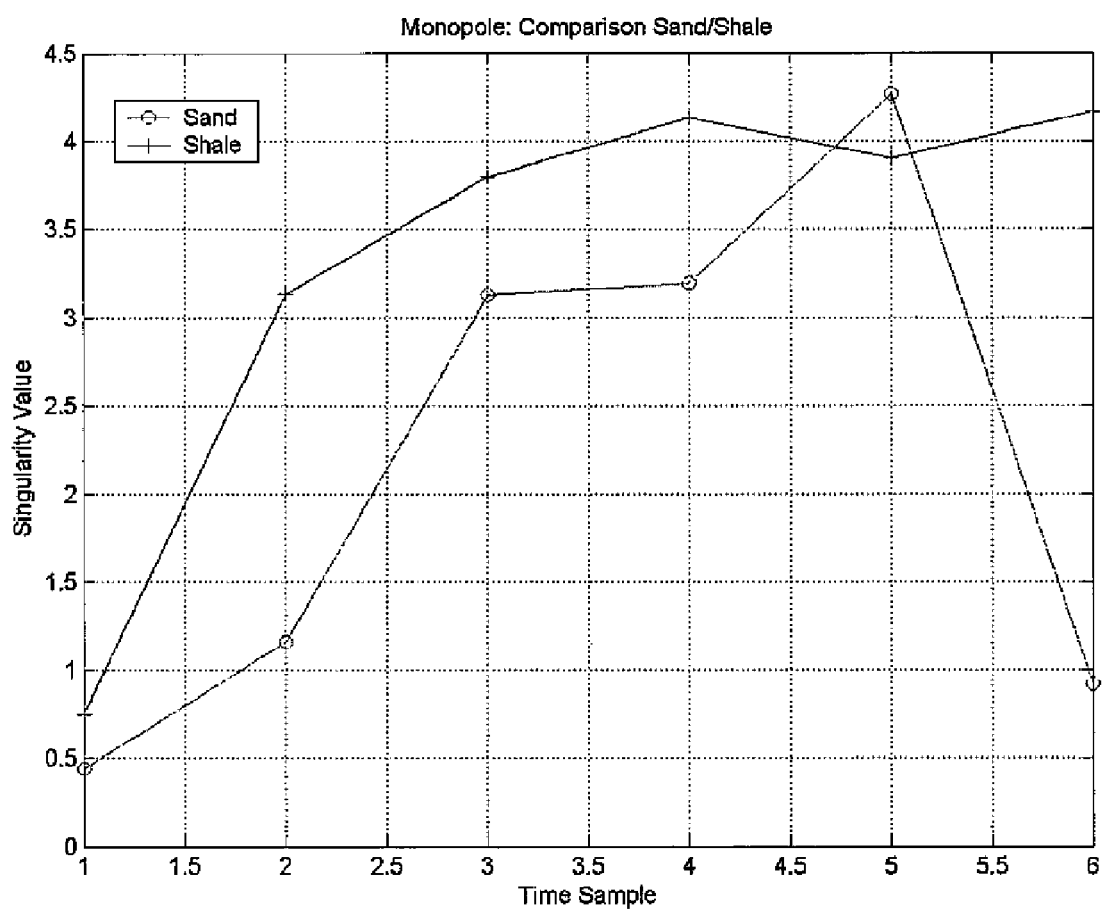
FIG. 18 is a graphical representation of the comparison of monopole singularities computed in the case of sand and shale intervals.

A second example is presented to illustrate another application of the proposed method. Two sets of monopole waveforms recorded with an acoustic tool as described above have been acquired respectively in a shale and a sand section of a well. First, the case of monopole recorded in sand is presented. FIG. 14 presents the compressional signal (middle), its wavelet transform (top), and the extracted maxima lines (bottom) in the case of the sand interval. FIG. 15 presents how the singularity is computed, i.e., the fit in the log|Wf(s,x)| versus log (scales) domain. FIGS. 16 and 17 present similar results, but in the case where the compressional wave has been recorded in the shale section. Note that there are visible differences between both figures illustrating the singularity difference values between both waveforms. FIG. 18 presents the singularity comparisons for compressional waves recorded in a shale and sand interval. Note the clear difference between the singularities computed for both cases, i.e., it is possible to differentiate a waveform recorded in a sand section of the well from one recorded in a shale section based on its singularity values. Both examples illustrate clearly the use of singularity to discriminate quantitatively waveforms recorded in different environments, i.e., recorded in a substratum with different petrophysical properties.

Figure 19:
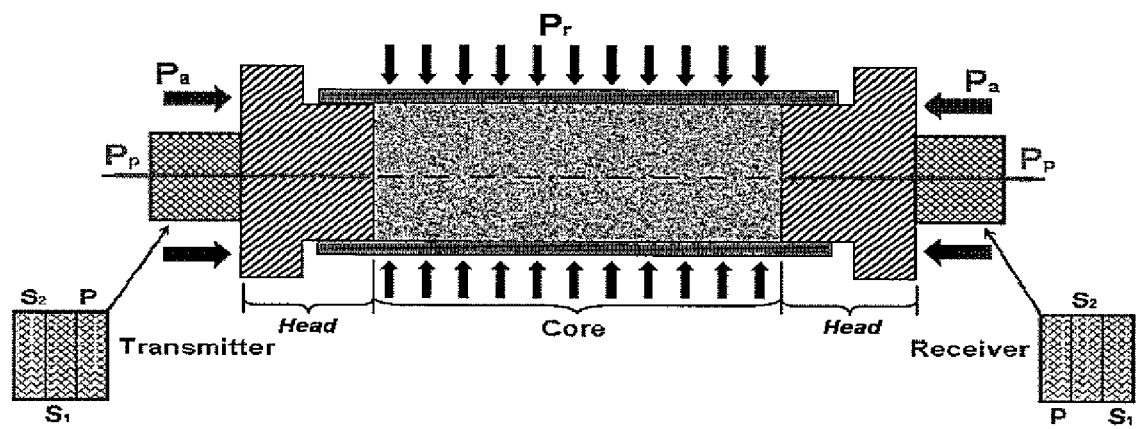
FIG. 19 is a schematic representation of the set up used for rock physics experiments.

In the following examples, singularities in waveforms are shown to discriminate various rock properties, such as: stress effects, rock types, pore fluid types, etc. In this case, the results for S waves are demonstrated to illustrate the ability to evaluate rock properties by use of the instant method. Similar results can also be obtained with P waves. Ultrasonic measurements were performed with an acoustic pressurized cell designed by Temco Inc [Temco]. FIG. 19 shows the setup with the position of transducers [NER] that enable the emission/reception of ultrasonic waves (P-, $S_1$- and $S_2$-waves that are orthogonally polarized) in a frequency range of 1 kHz to 4 MHz. The pressure control is made with three separated pumps [ISCO] for the pore pressure $P_p$, the radial (or confining) pressure $P_r$, and the axial pressure $P_a$, respectively. The sample is isolated inside a Hassler sleeve to avoid any contact with the external fluid allowing the pressure control. As one example, 2 different carbonates rocks were selected because of their wide range of permeability (Table 1 below).

| Sample | Porosity $\Phi$ (%) | Grain density $\rho_g$ (g/cc) | Permeability k (mD) |
|---|---|---|---|
| Q244 | 19.77 | 2.720 | 1.26 |
| Q263 | 18.77 | 2.901 | 343.72 |

The Q244 presents quasi-spherical pores and is supposedly non-connected regarding its permeability. The Q263 is composed of a wide range of pore shapes, which are connected together.

Figure 20:
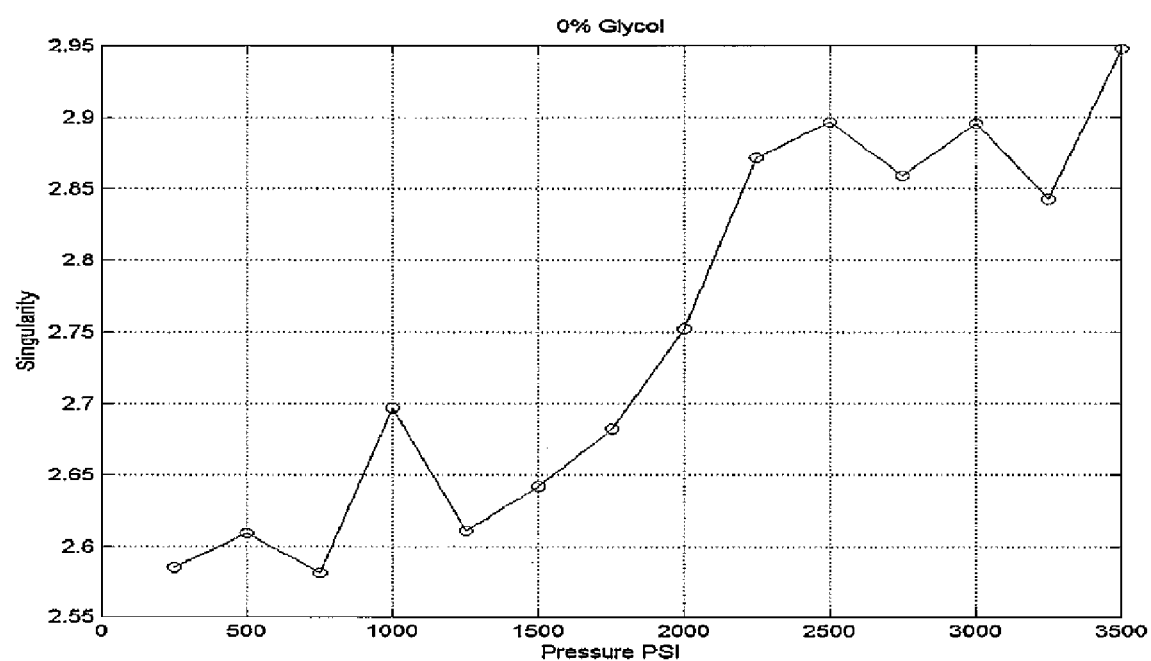
FIG. 20 is a graphical representation of the variation of singularity for the shear wave as a function of stress.

The first analysis concerns the study of the sample Q244 as a function of stress without fluid inclusion in the system (0% Glycol). In this case, only the first singularity corresponding to the S wave is plotted. It can be clearly observed that FIG. 20 shows the variation of singularity with the applied stress. Note the singularity values increase to reach a plateau at higher stress.

Figure 21:
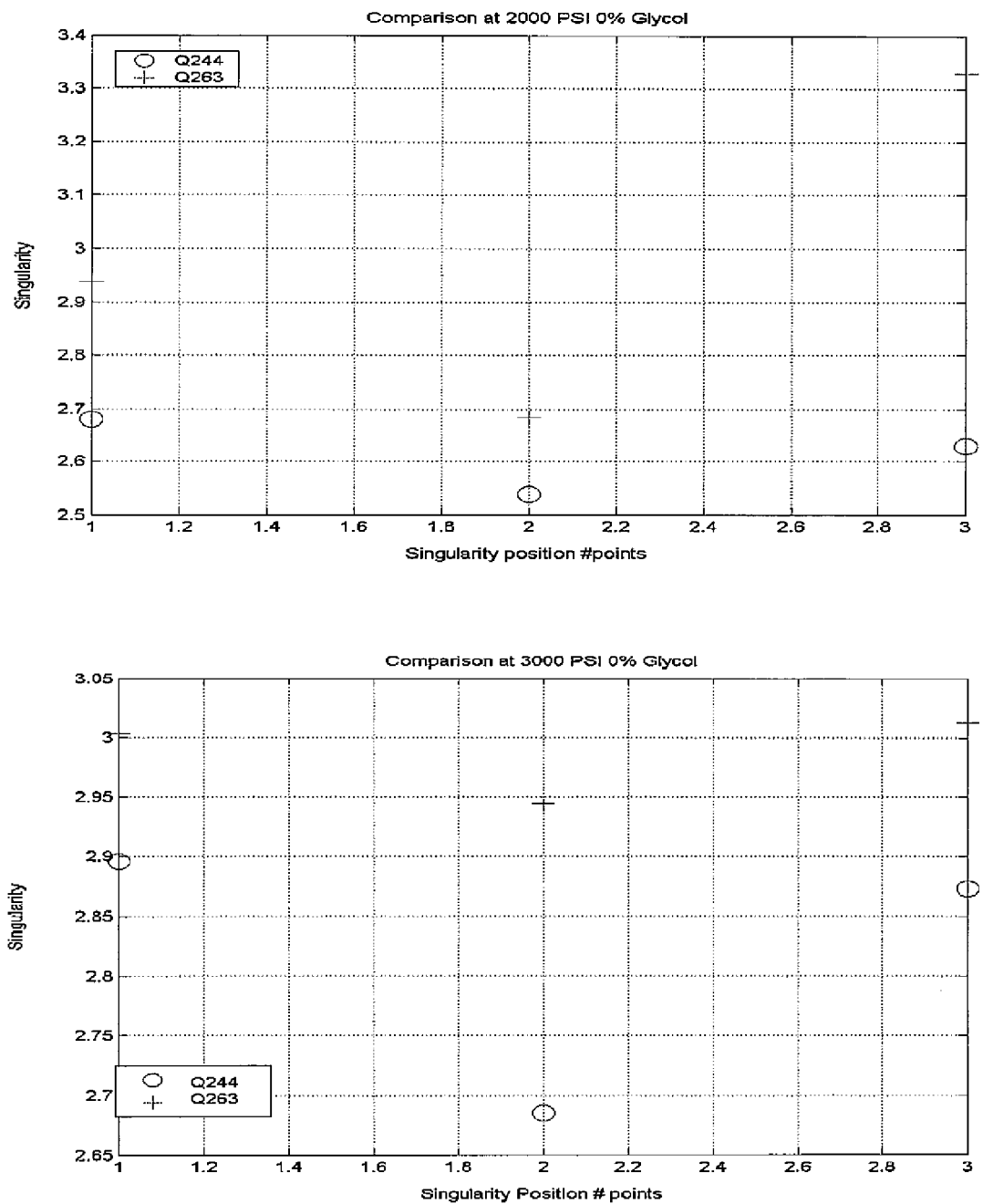
FIG. 21 is a graphical representation of singularities comparison between the two previous samples in the absence of glycol.
Figure 22:
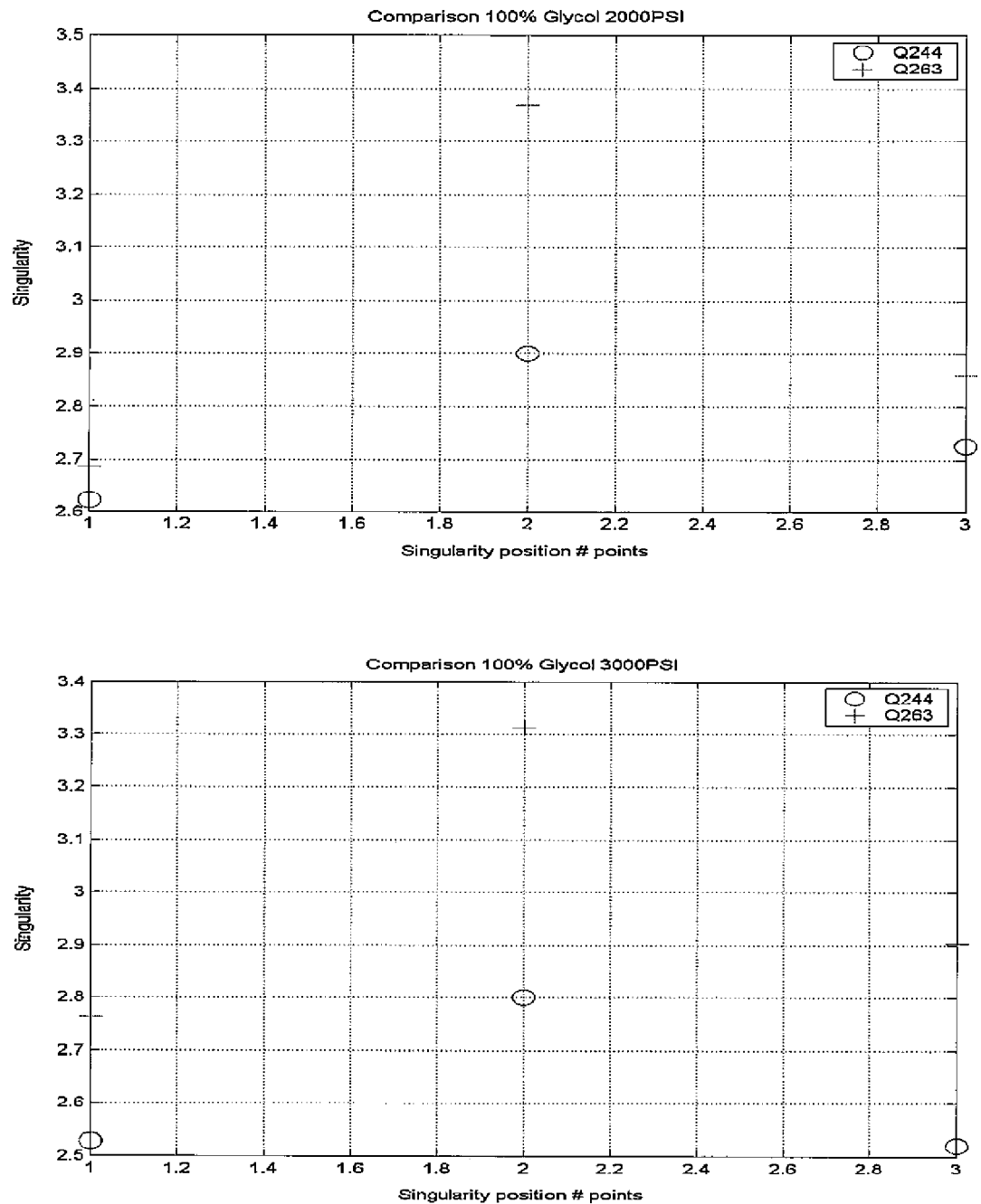
FIG. 22 is a graphical representation of singularities comparison between both samples fully saturated by glycol.

Next the two samples presented previously are compared using their singularity values. In this case, the shear wave recorded for each sample is used. In absence of glycol, i.e., no fluid has been injected in the rock, FIG. 21 presents the computed singularities for both samples under an applied stress of 2000 and 3000 psi, respectively. Note that the singularities of the Q263 sample have higher values than the Q244 sample. Next, the case where the rock is 100% saturated by glycol is considered. The same applied stress is set. In both cases the singularities of the Q263 sample have higher values than the Q244 sample, but they are smaller than in the previous case with no fluid (note FIG. 22).

Figure 23:
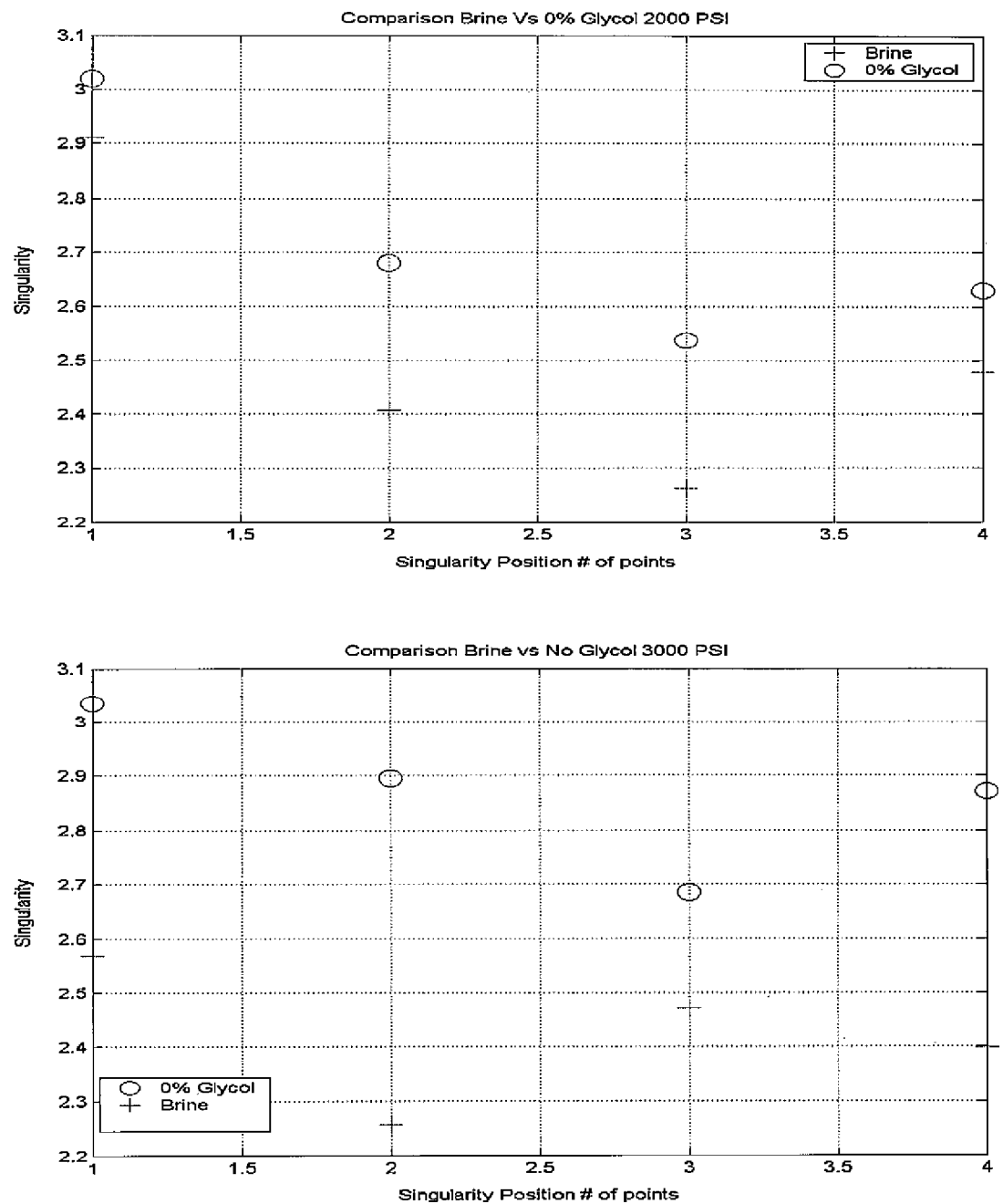
FIG. 23 is a graphical representation of the comparison of computed singularities, for both samples, saturated by brine and without glycol.
Figure 24:
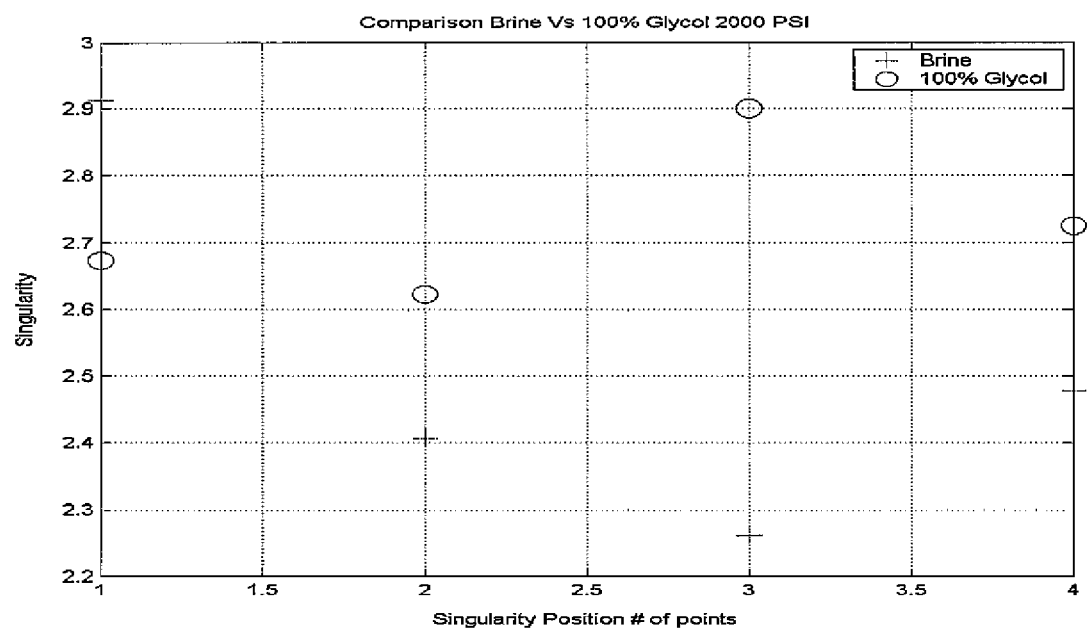
FIG. 24 is a graphical representation of the comparison of computed singularities, for both samples, saturated by brine and glycol.
Figure 24:
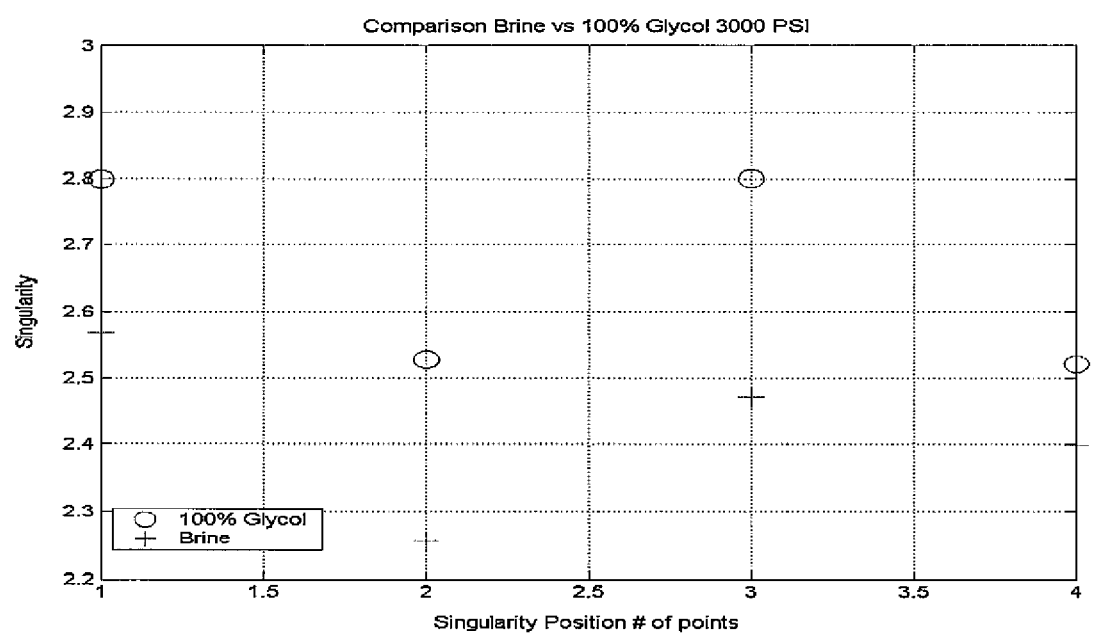

A final test consists in saturating the rock with brine and comparing the singularity calculations with the ones obtained when the rock is dry or saturated with glycol. In this example, the influence of fluid type on the singularities values is studied. In this case, two pressures are considered (2000 and 3000 psi). FIGS. 23 and 24 clearly show the variation of singularities depending on the presence or absence of fluid and on the fluid content. It has been shown in this case that it is possible to use singularities to discriminate rocks properties as a function of fluid type, rock type, permeability, porosity, stress, etc.

For further analysis, it may be desired to filter out the noise in the signal; the use of singularities makes this possible because certain singularities known to be associated with noise can be removed. The majority of the singularities in regions 501 and 502 (note FIG. 12) are filtered and removed from the analysis. The results of this removal are shown in FIG. 13. This keeps only the singularities that are of interest in the determination of the materials surrounding the receiver. The singularity analysis of an acoustic signal is a powerful tool in analyzing the properties of formations surrounding the borehole. Knowledge of the formation properties, i.e., for answer products, is essential to understand and exploit the reservoir. An answer product may contain a wide range of information including, but not limited to, reservoir parameters, seismic attributes, reservoir mapping, scaling, formation type, level of heterogeneity of surrounding rock, porosity, rock fraction detection, FMI imaging, and image processing. Furthermore, by adding other known petrophysical measurement data, such as data that are typically acquired through various tool measurements, for example, resistivity, nuclear, density, permeability, electro-magnetic, and the like, to the singularity analysis additional information about the formations may be provided. For example, by adding data from resistivity measurements with the data from singularities will increase the level of interpretation of the reservoir. As previously mentioned, various type of data known to those skilled in the art may be utilized for the purposes described herein.

An additional use for the algorithm is in extracting information of interest from the determined singularities. This is similar to the above where an individual signal is separated from a group of other signals of interest. Additionally, patterns of interest in images can be discerned which is useful in a wide range of applications. Once a signal or image is collected, it is also possible to characterize a discontinuity of interest and determine when the formation or other material changes.

In the foregoing description, reference has been made to a variety of embodiments. The subject disclosure, however, is not limited to wellhole technology and is rather intended to provide useful application in all contexts where time series data analysis is desired. Those skilled in the art and familiar with the instant disclosure may recognize additions, deletions, modifications, substitutions, and other changes which fall within the purview of the disclosure and claims.

What is claimed:

1. A method for analysis of oil field time-series data, comprising:
   acquiring data in an oil field;
   extracting singularities of the data;
   comparing said singularities to a control set with a known set of singularities to interpret the formation properties related to the data; and
   determining said formation properties based on said comparison.
2. The method as defined in claim 1, wherein the acquired data comprises one or more of sonic data, seismic data, and ultrasonic data.
3. The method as defined in claim 2, wherein the seismic data comprises vertical seismic profile (VSP) data.
4. The method as defined in claim 1, wherein the formation properties comprise one or more of rock type, fluid type, permeability, and porosity.
5. The method as defined in claim 1, further comprising the step of:
   filtering based on said singularities.
6. The method as defined in claim 1, wherein:
   prior to said extracting step:
   computing a wavelet transform with said acquired data; and
   computing Lipschitz coefficients utilizing said wavelet transform.
7. The method as defined in claim 6, wherein:
   computing said Lipschitz coefficients comprises determining local modulus maxima; and
   said local modulus maxima are computed by summing along the frequency axis.
8. The method as defined in claim 7, wherein:
   said summing of local modulus maxima are computed using the following formula:

$$S_W f(x) = \int_{|x-x_0| \leq K \cdot s} |Wf(s, x)| ds.$$

9. The method as defined in claim 1, wherein:
   said data is acquired utilizing at least one source and at least one receiver.
10. The method as defined in claim 1, wherein said time series data is collected at or above ground level.
11. The method as defined in claim 1, wherein: said time series data is collected downhole in a borehole.
12. The method as defined in claim 1, wherein: said time-series data is one or more data relating to resistivity, nuclear, density, permeability, electro-magnetic measurements.
13. The method as defined in claim 1, wherein: said time-series data is acoustic data.
14. The method as defined in claim 1, wherein: said time-series data is petrophysical data acquired through oil field tool measurements.
15. The method as defined in claim 14, wherein said time series data is collected via wireline.
16. The method as defined in claim 14, wherein said time series data is collected while drilling.
17. The method as defined in claim 1, wherein said interpretation is performed downhole.
18. The method as defined in claim 1, wherein said interpretation is performed at or near ground level.
19. A method for analysis of oil field time-series data comprising:
   acquiring data in an oil field;
   extracting singularities of the data;
   identifying the singularities related to unwanted signals in combination with known singularities related to the unwanted signals;
   filtering out the unwanted signal related to the identified singularities.
20. A method for analysis of oil field time-series data comprising:
   acquiring data in an oil field;
   extracting singularities related to unwanted the signals;
   using singularities in combination with known singularity measurements to interpret the formation properties.

* * * * *